(12) United States Patent
Ohtsubo

(10) Patent No.: US 10,558,068 B2
(45) Date of Patent: Feb. 11, 2020

(54) DISPLAY APPARATUS

(71) Applicant: Sakai Display Products Corporation, Osaka (JP)

(72) Inventor: Tomokazu Ohtsubo, Osaka (JP)

(73) Assignee: Sakai Display Products Corporation (JP)

( * ) Notice: Subject to any disclaimer, the term of this patent is extended or adjusted under 35 U.S.C. 154(b) by 0 days.

(21) Appl. No.: 15/755,252

(22) PCT Filed: Aug. 31, 2015

(86) PCT No.: PCT/JP2015/074805
§ 371 (c)(1),
(2) Date: Jun. 25, 2018

(87) PCT Pub. No.: WO2017/037856
PCT Pub. Date: Mar. 9, 2017

(65) Prior Publication Data
US 2018/0299722 A1 Oct. 18, 2018

(51) Int. Cl.
*H05K 7/02* (2006.01)
*H05K 7/04* (2006.01)
*G02F 1/1333* (2006.01)
*G02F 1/1335* (2006.01)

(52) U.S. Cl.
CPC .. *G02F 1/133308* (2013.01); *G02F 1/133606* (2013.01); *G02F 2001/133322* (2013.01)

(58) Field of Classification Search
USPC ........................................ 361/807, 809, 810
See application file for complete search history.

(56) References Cited

U.S. PATENT DOCUMENTS

| | | | |
|---|---|---|---|
| 7,380,972 B2 * | 6/2008 | Shimizu | G02B 6/0088 349/59 |
| 8,625,049 B2 * | 1/2014 | Kim | G02F 1/133608 349/62 |
| 2007/0297195 A1 * | 12/2007 | Hu | G02F 1/133606 362/633 |
| 2009/0033827 A1 * | 2/2009 | Chen | G02B 6/0088 349/58 |
| 2014/0301108 A1 | 10/2014 | Mineura et al. | |
| 2016/0282549 A1 * | 9/2016 | Masuda | G02B 6/0085 |
| 2016/0356952 A1 * | 12/2016 | Kawabata | G02B 6/0088 |

FOREIGN PATENT DOCUMENTS

| | | |
|---|---|---|
| JP | 2004279864 A | 10/2004 |
| JP | 2012113873 A | 6/2012 |
| JP | 2013026110 A | 2/2013 |
| JP | 2013101827 A | 5/2013 |

* cited by examiner

*Primary Examiner* — Hung S. Bui
(74) *Attorney, Agent, or Firm* — St. Onge Steward Johnston & Reens, LLC

(57) ABSTRACT

A display apparatus capable of preventing wrinkles from occurring on an optical sheet due to thermal expansion, while suppressing damage caused by the movement of the optical sheet when the optical sheet vibrates, is provided. In order to prevent wrinkles from occurring due to thermal expansion while suppressing damage caused by the movement of the optical sheet when the optical sheet vibrates, a clearance between an engaging hole provided in a central engagement flange and the protrusion engaging with the engaging hole is smaller than a clearance between an engaging hole provided in an engagement flange other than the central engagement flange and the protrusion.

16 Claims, 5 Drawing Sheets

DISPLAY APPARATUS

FIELD OF THE INVENTION

The present invention relates to a display apparatus comprising a display panel and a holding member having a plurality of protrusions protruding in a thickness direction of the display panel, the plurality of protrusions engaging with an optical sheet to hold the optical sheet so that the optical sheet faces the display panel.

BACKGROUND OF THE INVENTION

A display apparatus having a liquid crystal panel is equipped with an optical sheet for diffusing or condensing light from a light source. The optical sheet is positioned between the liquid crystal panel and the light source.

Such an optical sheet is thermally expanded due to the heat generated by the light source, thereby causing wrinkles, deflections, and the like. There are various methods for preventing the optical sheet from causing wrinkles, deflections, and the like.

For example, JP 2004-279864 A discloses a liquid crystal display apparatus including a plurality of holes provided along two neighboring sides of a substantially rectangular sheet, so that the holes are used to hold the sheet so as to prevent the sheet from causing wrinkles, deflections, and the like when the liquid crystal display apparatus is placed vertically or horizontally.

SUMMARY OF THE INVENTION

On the other hand, there is a problem that the thermal expansion amount of the optical sheet is variable depending on the location of the optical sheet. This problem should be considered in solving the problem of wrinkles occurring due to thermal expansion of the optical sheet. However, such a problem is not taken into consideration in the liquid crystal display apparatus discussed in JP 2004-279864 A.

Further, when vibration test on the display apparatus is performed or the display apparatus is transported, the display apparatus is subjected to vibrations. Therefore, another problem such that the optical sheet may be damaged arises when the optical sheet rattles and moves due to vibrations. However, this problem is not also taken into consideration in the liquid crystal display apparatus discussed in JP 2004-279864 A.

The present invention has been made in view of the above-mentioned circumstances and an object of the present invention is to provide a display apparatus which can prevent wrinkles from occurring on the optical sheet due to thermal expansion, while suppressing the damage caused by the movement of the optical sheet when the display apparatus vibrates, considering the above-mentioned problem in a display apparatus comprising a display panel and a holding member having a plurality of protrusions protruding in a thickness direction of the display panel, the plurality of protrusions engaging with an optical sheet to hold the optical sheet so that the optical sheet faces the display panel.

The display apparatus according to one embodiment of the present invention is a display apparatus including a display panel and a holding member having a plurality of protrusions protruding in a thickness direction of the display, the plurality of protrusions engaging with an optical sheet to hold the optical sheet so that the optical sheet faces the display panel, wherein the optical sheet is rectangular, and has a plurality of engagement flanges provided to one side of the optical sheet, the optical sheet has a plurality of engaging holes, each of the plurality of engagement flanges has one engaging hole of the plurality of engaging holes, and each of the plurality of engaging holes corresponds to one protrusion of the plurality of protrusions, the plurality of engagement flanges include a central engagement flange provided to a central region of the one side of the optical sheet, and a clearance between a first engaging hole, which is one of the plurality of engaging holes and is provided in the central engagement flange, and a first protrusion, which is one of the plurality of protrusions and is engaged with the first engaging hole, is smaller than a clearance between a second engaging hole, which is provided in a second engagement flange other than the central engagement flange among the plurality of engagement flanges, and a second protrusion other than the first protrusion among the plurality of protrusions and engaged with the second engaging hole provided in the second engaging flange.

In one embodiment of the present invention, the optical sheet is rectangular, and the thermal expansion amount in a central region of the optical sheet is small. Accordingly, the clearance between the first engaging hole provided in the central engagement flange, which is provided to the central region of the one side of the optical sheet, and the first protrusion is set to be smaller than the clearance between the second engaging hole of the second engagement flange other than the central engagement flange and the second protrusion. Therefore, the problem of wrinkles occurring due to thermal expansion can be resolved while suppressing the damage caused by the movement of the optical sheet when the display apparatus vibrates.

In the display apparatus according to one embodiment of the present invention, the clearance between the first engaging hole provided in the central engagement flange and the first protrusion in a direction orthogonal to the one side and along a surface of the optical sheet is equal to or larger than the clearance between the first engaging hole and the first protrusion in a direction along the one side and along the surface of the optical sheet.

In one embodiment of the present invention, since the optical sheet is rectangular, in the central region of the one side of the optical sheet, substantially no thermal expansion occurs in the direction along the one side and along the surface of the optical sheet, although the thermal expansion in the direction orthogonal to the one side and along the surface of the optical sheet occurs to some extent. Accordingly, the embodiment addresses such a thermal expansion by setting the clearance in the direction orthogonal to the one side and along the surface of the optical sheet to be sufficiently large.

In the display apparatus according to one embodiment of the present invention, the clearance between the second engaging hole provided in the second engagement flange and the second protrusion in a direction orthogonal to the one side and along a surface of the optical sheet is smaller than the clearance between the second engaging hole and the second protrusion in a direction along the one side and along the surface of the optical sheet.

In one embodiment of the present invention, since the optical sheet is rectangular, in a region other than the central region of the one side, the thermal expansion in the direction orthogonal to the one side and along the surface of the optical sheet is smaller than the thermal expansion in the direction along the one side and along the surface of the optical sheet, namely, in the longitudinal direction of the optical sheet. Accordingly, the embodiment addresses such a thermal expansion by setting the clearance in the longitudinal direction of the optical sheet to be sufficiently large.

In the display apparatus according to one embodiment of the present invention, the clearance between the first engaging hole provided in the central engagement flange and the first protrusion is formed only in the direction orthogonal to the one side and along a surface of the optical sheet.

In one embodiment of the present invention, since the optical sheet is rectangular, in the central region of the one side, substantially no thermal expansion occurs in the direction along the one side and along the surface of the optical sheet although the thermal expansion in the direction orthogonal to the one side and along the surface of the optical sheet occurs to some extent. Accordingly, the embodiment addresses such a thermal expansion by providing the clearance only in the direction orthogonal to the one side and along the surface of the optical sheet.

In the display apparatus according to one embodiment of the present invention, the plurality of engagement flanges are further provided along another side, which is opposite to the one side, of the optical sheet.

In one embodiment of the present invention, since the optical sheet is rectangular, the plurality of engagement flanges are provided, for example, along one long side, and, along another long side, which is opposite to the one long side.

In the display apparatus according to one embodiment of the present invention, each of the plurality of protrusions of the holding member has a constant size, and the first engaging hole provided in the central engagement flange is smaller than the second engaging hole.

In one embodiment of the present invention, the first engaging hole provided in the central engagement flange is set to be smaller than the second engaging hole, so that the clearance between the first engaging hole provided in the central engagement flange and the first protrusion becomes smaller than the clearance between the second engaging hole provided in the second engagement flange other than the central engagement flange and the second protrusion.

In the display apparatus according to one embodiment of the present invention, each of the plurality of engaging holes has a constant size, and the first protrusion corresponding to the first engaging hole provided in the central engagement flange is greater in size than the second protrusion corresponding to the second engaging hole provided in the second engagement flange.

In one embodiment of the present invention, the first protrusion corresponding to the first engaging hole provided in the central engagement flange is set to be greater in size than the second protrusion corresponding to the second engaging hole provided in the second engagement flange, so that the clearance between the first engaging hole provided in the central engagement flange and the first protrusion becomes smaller than the clearance between the second engaging hole provided in the second engagement flange other than the central engagement flange and the second protrusion.

The present invention can prevent wrinkles from occurring on an optical sheet due to thermal expansion, while surely suppressing the movement of the optical sheet.

DETAILED DESCRIPTION OF THE INVENTION

Hereinafter, a display apparatus according to an embodiment of the present invention, which has been applied to a so-called liquid crystal television receiver equipped with a liquid crystal panel, will be described in detail below with reference to attached drawings.

Figure 1:
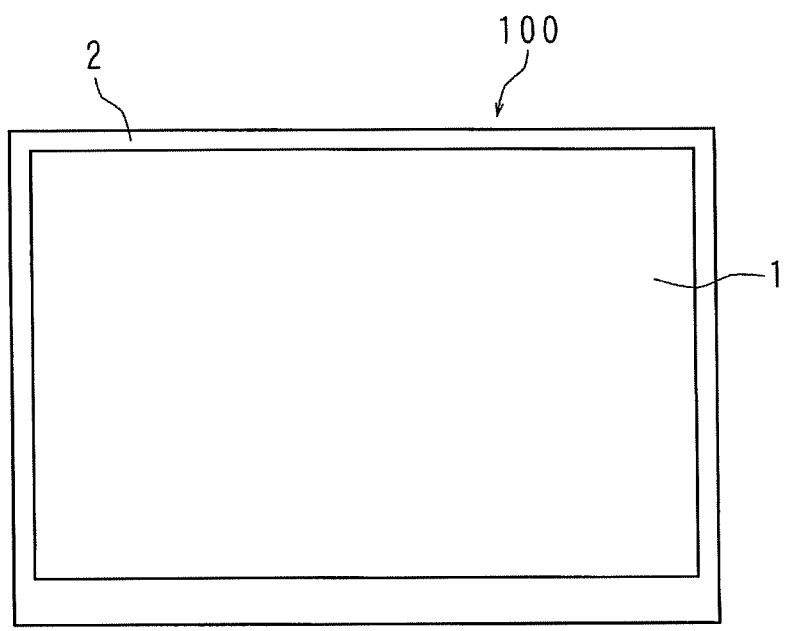
FIG. 1 is a front view illustrating the appearance of a liquid crystal television receiver according to a first embodiment.

FIG. 1 is a front view illustrating the appearance of a liquid crystal television receiver 100 according a first embodiment. In the liquid crystal television receiver 100, a liquid crystal display panel 1 and other components are accommodated in a bezel 2 and a backlight chassis 6 described below.

Figure 2:
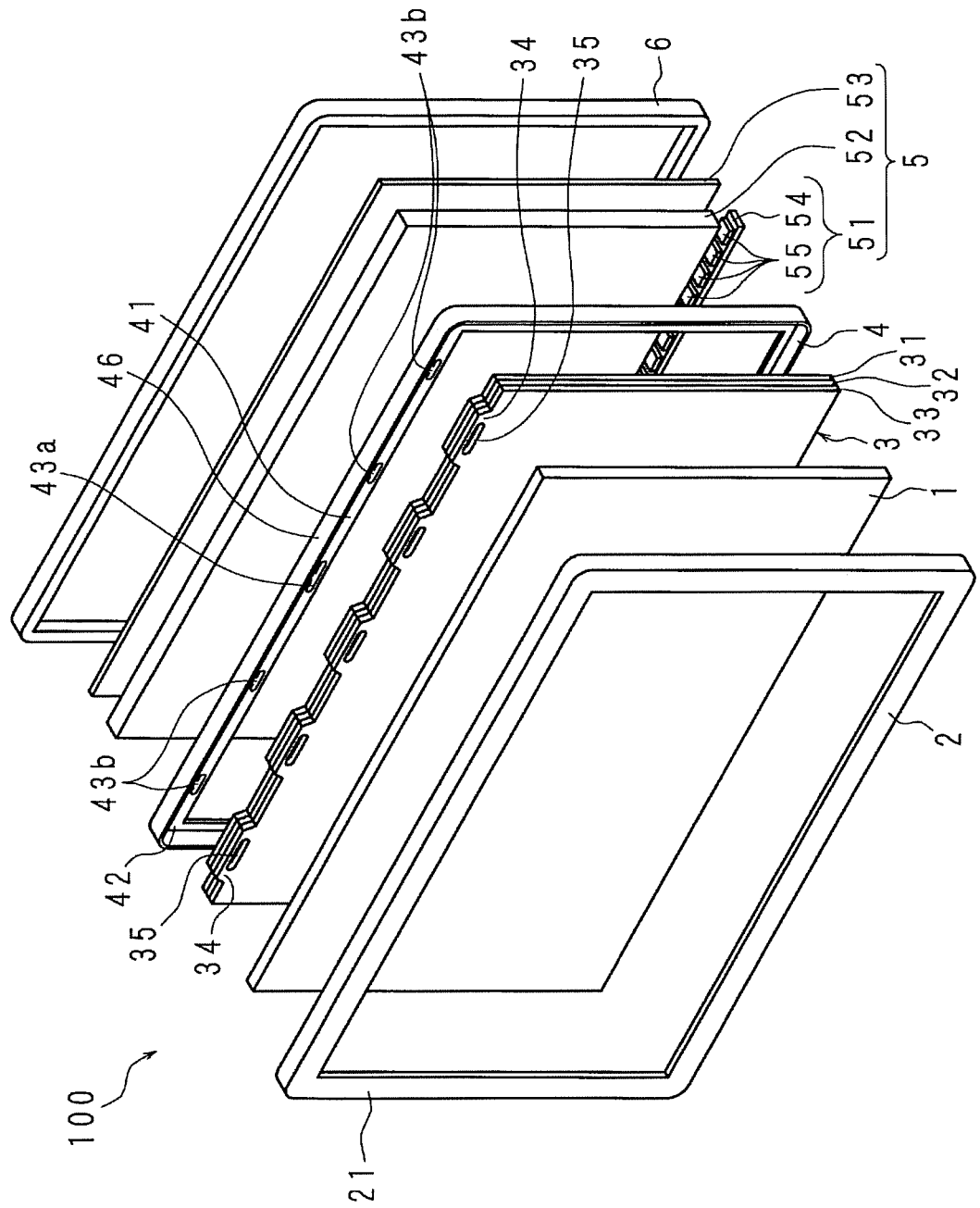
FIG. 2 is an exploded perspective view schematically illustrating a main part constituting the liquid crystal television receiver according to the first embodiment.

FIG. 2 is an exploded perspective view schematically illustrating a main part constituting the liquid crystal television receiver 100 according to the first embodiment.

The liquid crystal television receiver 100 according to the present embodiment, as illustrated in FIGS. 1 and 2, includes the rectangular liquid crystal display panel 1 on one surface at a front of the liquid crystal television receiver 100. The liquid crystal display panel 1 displays an image on the one surface. The liquid crystal television receiver 100 further includes an optical sheet 3, a holding member 4, a light source device 5, and the backlight chassis 6 provided in this order rearward of the liquid crystal display panel 1. The light source device 5 includes a light source 51, a light guiding plate 52, and a reflection sheet 53.

The light source device 5 is accommodated in the backlight chassis 6, which has a rectangular parallelepiped box shape with one opening. A peripheral edge of the optical sheet 3 and a sidewall of the backlight chassis 6 are surrounded by the bezel 2 formed in a rectangular frame-shape.

The optical sheet 3 is disposed in such a manner that one surface of the optical sheet 3 faces an another surface, which is opposite to the one surface of the liquid crystal display panel 1, of the liquid crystal display panel 1. The light guiding plate 52 is disposed in such a manner that one surface of the light guiding plate 52 faces an another surface, which is opposite to the one surface of the optical sheet 3, of the optical sheet 3. Further, the reflection sheet 53 is disposed in such a manner that one surface of the reflection sheet 53 faces an another surface, which is opposite to the one surface of the light guiding plate 52, of the light guiding plate 52.

The bezel 2 is a rectangular frame body. The bezel 2 includes a rectangular tubular side plate, and a frame part 21 being an annular plate extending inward from one end of the side plate. The bezel 2 has an L-shaped cross section cut in the thickness direction of the liquid crystal television receiver 100. The frame part 21 of the bezel 2 is disposed frontward of the liquid crystal display panel 1. Users can visually recognize an image displayed on the one surface of the liquid crystal display panel 1 through the frame part 21. The frame part 21 of the bezel 2 covers a peripheral region of the one surface of the liquid crystal display panel 1.

The liquid crystal display panel 1 is a display panel having a rectangular plate shape. The liquid crystal display panel 1 is an active matrix type display. The liquid crystal display panel 1 has a polarizing sheet (not shown) on the another surface of the liquid crystal display panel 1. The polarizing sheet separates light entered into the polarizing sheet into P wave (horizontal polarized light component) and S wave (vertical polarized light component), and only P wave goes out toward the one surface of the liquid crystal display panel 1 and S wave is absorbed in the polarizing sheet. The liquid crystal display panel 1 may be, for example, an electrophoretic liquid crystal panel.

The optical sheet 3 facing the another surface of the liquid crystal display panel 1 is a known optical sheet. Light emitted from a light source 51 described below and entered into the optical sheet 3 through the light guiding plate 52 is diffused and condensed by the optical sheet 3, and then, more uniform light is emitted from the optical sheet 3 toward the liquid crystal display panel 1. For example, the optical sheet 3 comprises laminated three unit sheets 31, 32 and 33. In particular, the optical sheet 3 comprises two diffusion sheets 31, 33 and a prism sheet 32. The prism sheet 32 is interposed between the two diffusion sheets 31, 33. The diffusion sheet 31, the prism sheet 32, and the diffusion sheet 33 are in a rectangular shape and have the same size.

One of the two diffusion sheets 31, 33 facing the light guiding plate 52 is an optical sheet that diffuses light entering from the light source 51 through the light guiding plate 52 and emits the light into the prism sheet 32. The prism sheet 32 is an optical sheet that condenses the light entered through the diffusion sheet 31 and emits the light toward the diffusion sheet 33. The light passed through the prism sheet 32 enters the diffusion sheet 33 vertically to the prism sheet 32.

The diffusion sheet 33 facing the liquid crystal display panel 1 is an optical sheet that further diffuses the light entered through the prism sheet 32 and emits the light with more uniform luminance distribution toward the another surface of the liquid crystal display panel 1. In the following description, for convenience of explanation, the diffusion sheets 31, 33 and the prism sheet 32 may be collectively referred to as optical sheet 3.

The optical sheet 3 has five engagement flanges 34 on one long side of the optical sheet 3. The engagement flange 34 is engaged with the holding member 4. Each engagement flange 34 is rectangular, and each engagement flange 34 is provided with an engaging hole 35 to be engaged with the holding member 4. For example, the engaging hole 35 has an opening extending in the longitudinal direction of the optical sheet 3.

The five engagement flanges 34 (the engaging holes 35) are provided so as to correspond to engaging protrusions 43a, 43b of the holding member 4 described below. One engagement flange 34 is provided to a central region in a direction along the one long side of the optical sheet 3, and two engagement flanges 34 are provided at the same intervals on each side of the engagement flange 34 positioned in the central region. In the following description, the engagement flange 34 positioned in the central region may be referred to as central engagement flange 34, and the engaging hole 35 provided in the central engagement flange 34 may be referred to as central engaging hole 35.

The holding member 4 for holding the optical sheet 3 is provided in the vicinity of the peripheral region of the another surface of the optical sheet 3 (the surface facing the light guiding plate 52). The holding member 4, when engaging with the optical sheet 3, can hold the optical sheet 3 so that the optical sheet 3 faces the liquid crystal display panel 1.

The holding member 4 is a frame body including a rectangular tabular retainer plate 41a with a rectangular opening in a central region of the retainer plate 41a and a peripheral plate 46 provided along an outer periphery of the retainer plate 41. The size of the opening is smaller than the one surface of the light guiding plate 52.

The retainer plate 41 has a plurality of engaging protrusions 43a, 43b protruding in the thickness direction of the liquid crystal display panel 1 in an edge region along one long side of one surface 42 of the retainer plate 41 facing the optical sheet 3. The engaging protrusion 43a (hereinafter, referred to as central engaging protrusion 43a) among the plurality of engaging protrusions 43a, 43b is provided in the central region of the one long side, and the engaging protrusions 43b are provided in another region. In the direction along the one long side, two engaging protrusions 43b are provided on each side of the central engaging protrusion 43a. In the following description, the engaging protrusions 43a, 43b may be simply referred to as engaging protrusions 43. The engaging protrusions 43a, 43b will be described in detail below.

The rectangular light guiding plate 52 is disposed so that the light guiding plate 52 faces the another surface of the optical sheet 3. More specifically, the one surface of the light guiding plate 52 is disposed so that the light guiding plate 52 faces the another surface of the optical sheet 3. The light guiding plate 52 diffuses light emitted from the light source 51 and entering through an end surface to cause the light to advance from the one surface toward the optical sheet 3.

The light guiding plate 52 is made of, for example, a transparent plate member (glass, acrylic resin, polycarbonate resin, or the like). When point light sources such as LEDs are used as the light source, the light guiding plate 52 diffuses light from each point light source and causes the light to advance as uniform plane emission from the one surface of the light guiding plate 52.

The reflection sheet 53 is, for example, rectangular and has one surface disposed so that the one surface of the reflection sheet 53 faces the another surface of the light guiding plate 52. The reflection sheet 53 returns the light emitted from the another surface of the light guiding plate 52 to the light guiding plate 52.

The light source 51 is provided on the end surface of the light guiding plate 52. The light source 51 includes, for example, a plurality of light emitting diodes (LEDs) 55 mounted on a substrate 54.

Figure 3:
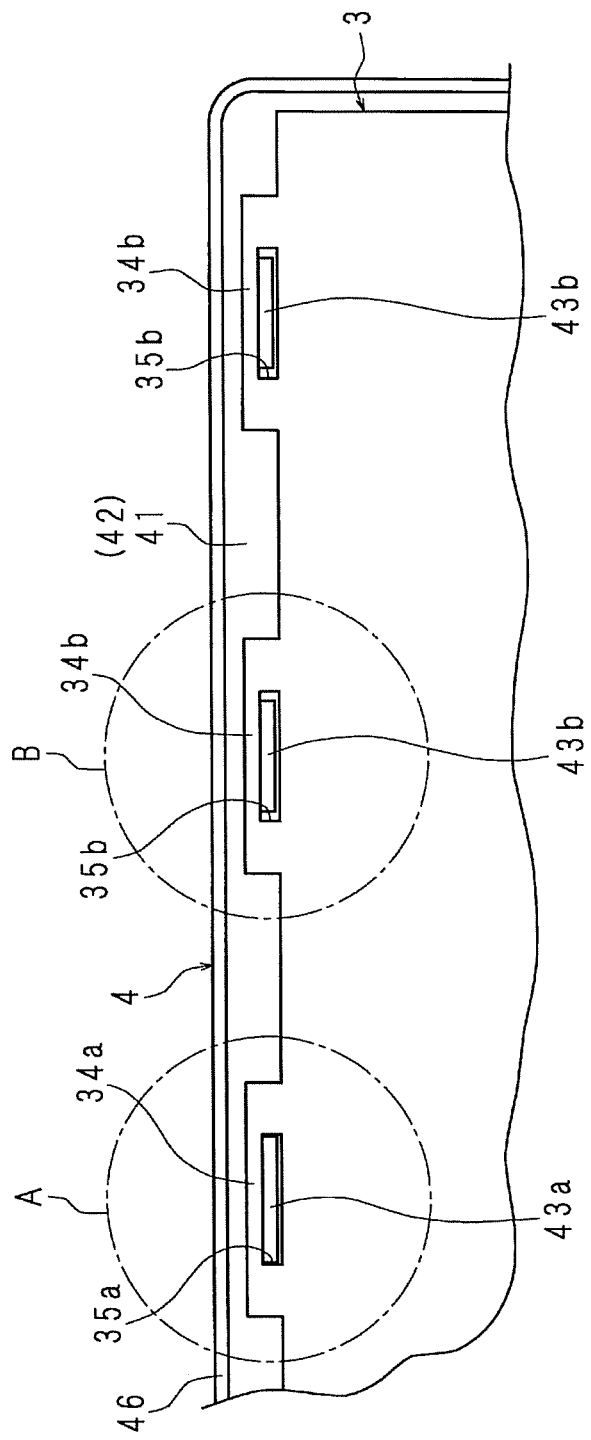
FIG. 3 illustrates an exemplary engagement between an optical sheet and a holding member in the liquid crystal television receiver according to the first embodiment.

FIG. 3 illustrates an exemplary engagement between the optical sheet 3 and the holding member 4, in the liquid crystal television receiver 100 according to the first embodiment.

The optical sheet 3 is held by the holding member 4 so as to cover the opening of the retainer plate 41 of the holding member 4. In other words, the holding member 4 holds the optical sheet 3 so that the optical sheet 3 faces the liquid crystal display panel 1. The optical sheet 3 is larger than the opening of the holding member 4, and the peripheral region of the optical sheet 3 is held by the annular one surface 42 of the retainer plate 41.

In a state where the engagement flanges 34 of the optical sheet 3 are in contact with the one surface 42 of the retainer plate 41 of the holding member 4, the holding member 4 positions and holds the optical sheet 3 by engaging the engaging holes 35 of the engagement flanges 34 of the optical sheet 3 with the central engaging protrusion 43a and the engaging protrusions 43b. More specifically, a central engaging hole 35a of the central engagement flange 34a is engaged with the central engaging protrusion 43a of the holding member 4, and engaging holes 35b of engagement flanges 34b other than the central engagement flange 34a are engaged with the engaging protrusions 43b other than the central engaging protrusion 43a of the holding member 4.

Each of the central engaging hole 35a and the engaging holes 35b is a long hole. The central engaging protrusion 43a and the engaging protrusions 43b have shapes conforming to the central engaging hole 35a and the engaging holes 35b, respectively, in the thickness direction of the optical sheet 3.

As mentioned above, engaging the central engaging hole 35a and the engaging holes 35b with the central engaging protrusion 43a and the engaging protrusions 43b enables the holding member 4 to hold the optical sheet 3.

In the liquid crystal television receiver 100 according to the first embodiment, the clearance between the engaging hole 35 and the engaging protrusion 43 when the engaging hole 35 is engaged with the engaging protrusion 43 is configured to be differentiated depending on the position.

Figure 4:
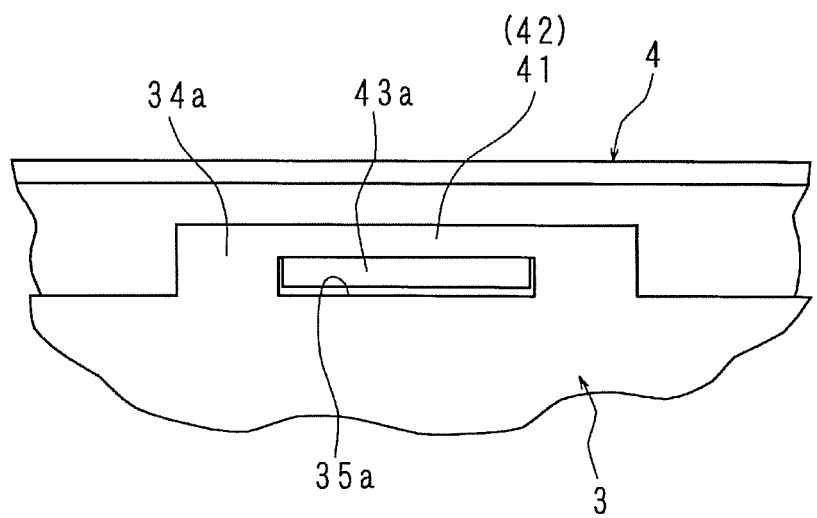
FIG. 4 is an enlarged view illustrating a portion A illustrated in FIG. 3.
Figure 5:
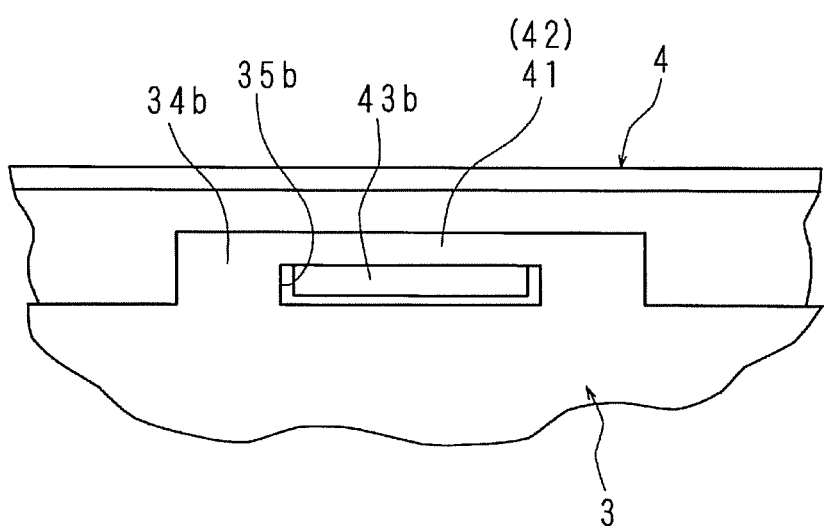
FIG. 5 is an enlarged view illustrating a portion B illustrated in FIG. 3.

FIG. 4 is an enlarged view illustrating a portion A illustrated in FIG. 3. FIG. 5 is an enlarged view illustrating a portion B illustrated in FIG. 3. FIG. 4 illustrates an exemplary engagement between the central engaging protrusion 43a and the central engaging hole 35a, and FIG. 5 illustrates an exemplary engagement between the engaging protrusion 43b and the engaging hole 35b.

In other words, FIG. 4 illustrates the engagement in a central region of the optical sheet 3 in the longitudinal direction, and FIG. 5 illustrates the engagement in a region other than the central region. In the present embodiment, for example, the central region refers to a range of ±10% from the center of the optical sheet 3 in the longitudinal direction. Such a range is based on the dimensions in the longitudinal direction of the optical sheet 3.

Figure 6:
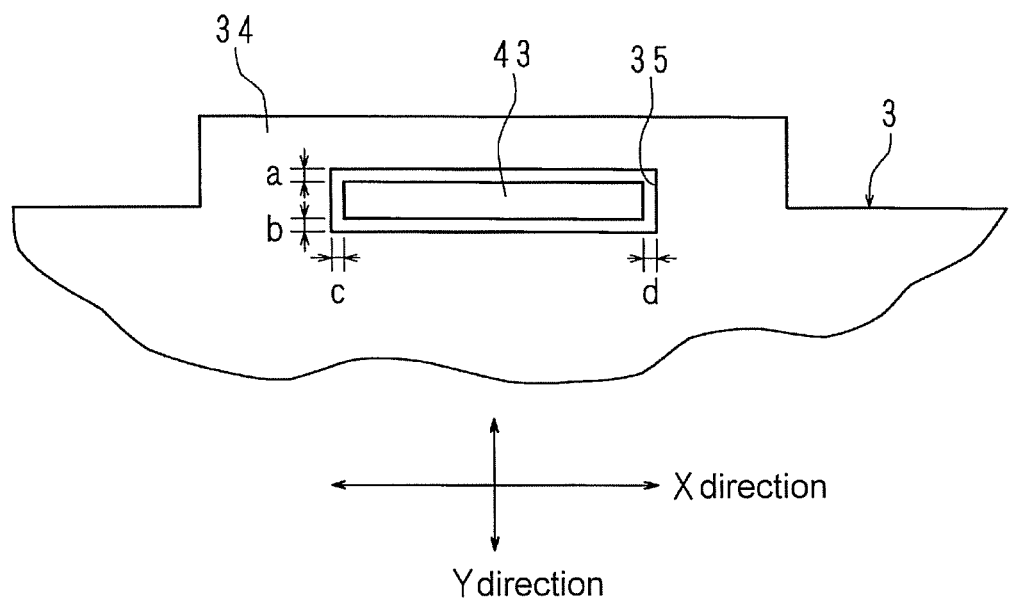
FIG. 6 illustrates an exemplary clearance existing between an engaging protrusion and an engaging hole when the engaging protrusion is engaged with the engaging hole in the first embodiment.

FIG. 6 illustrates an exemplary clearance existing between the engaging protrusion 43 and the engaging hole 35 when the engaging protrusion 43 is engaged with the engaging hole 35 in the first embodiment.

In the following description, as illustrated in FIG. 6, Y direction is a direction extending orthogonal to the above-mentioned one long side of the optical sheet 3 and along the surface of the optical sheet 3, and X direction is a direction extending along the one long side of the optical sheet 3 and along the surface of the optical sheet 3.

In the Y direction, the clearance between the engaging protrusion 43 and the engaging hole 35 existing on the upper side (as viewed) of the engaging protrusion 43 is referred to as clearance a, and the clearance between the engaging protrusion 43 and the engaging hole 35 existing on the lower side (as viewed) of the engaging protrusion 43 is referred to as clearance b.

In the X direction, the clearance between the engaging protrusion 43 and the engaging hole 35 existing on the left side (as viewed) of the engaging protrusion 43 is referred to as clearance c, and the clearance between the engaging protrusion 43 and the engaging hole 35 existing on the right side (as viewed) of the engaging protrusion 43 is referred to as clearance d.

As illustrated in FIG. 4, in the engagement between the central engaging protrusion 43a and the central engaging hole 35a, the clearance a is not present and only the clearances b, c, and d are present, and the clearance b is larger than any one of the clearances c and d.

In addition, the total size of the clearances c and d summed up in the X direction is equal to or less than the total size of the clearances a and b summed up in the Y direction.

As mentioned above, for the engagement in the central region in the longitudinal direction of the optical sheet 3, sufficiently securing the clearance in the Y direction and minimizing the clearance in the X direction can address not only the thermal expansion of the optical sheet 3 but also the rattling of the optical sheet 3 occurring due to vibrations.

More specifically, the thermal expansion in the central region of the optical sheet 3 is mainly linear expansion in the Y direction and linear expansion in the X direction seldom occurs. In view of the above, sufficiently securing the clearance in the Y direction enables the optical sheet 3 to freely expand and contract in the Y direction during the thermal expansion of the optical sheet 3 and in advance prevents wrinkles from occurring in the vicinity of the central engaging hole 35a (the central engaging protrusion 43a).

In addition, minimizing the clearance in the X direction can restrict the movement of the optical sheet 3. Accordingly, rattling of the optical sheet 3 due to externally added vibrations can be prevented and the damage of the optical sheet 3 occurring by the rattling can be prevented in advance. Reducing the clearance a can further restrict the movement of the optical sheet 3.

To realize the above-mentioned configuration, each of the engaging holes 35 may be set to have a constant size and the central engaging protrusion 43a may be set to be greater in size than the engaging protrusions 43b other than the central engaging protrusion 43a, or each of the engaging protrusions 43 may be set to have a constant size and the central engaging hole 35a may be set to be smaller in size than the engaging holes 35b other than the central engaging hole 35a In addition, as illustrated in FIG. 5, in the engagement between the engaging protrusion 43b and the engaging hole 35b, it is configured in such a manner that the clearance a is not present and only the clearances b, c, and d are present, and the clearance b is larger than any one of the clearances c and d.

On the other hand, in the engagement between the engaging protrusion 43b and the engaging hole 35b, it is configured in such a manner that the clearance in the above-mentioned X direction becomes larger than the clearance in the above-mentioned Y direction.

As mentioned above, for the engagement in a region other than the central region of the optical sheet 3, sufficiently securing the clearances in the X and Y directions and setting the clearance in the X direction to be larger than the clearance in the Y direction can effectively address the thermal expansion of the optical sheet 3.

More specifically, in the region other than the central region of the optical sheet 3, linear expansion (thermal expansion) occurs in both the X and Y directions, and especially the linear expansion in the X direction is larger compared to that in the central region. Further, since the optical sheet 3 is rectangular, the thermal expansion in the X direction (i.e., longitudinal direction) is larger than the thermal expansion in the Y direction (shorter direction).

Accordingly, setting the clearance in the X direction to be larger than the clearance in the Y direction can appropriately address the thermal expansion of the optical sheet 3 and in advance can prevent wrinkles from occurring in the vicinity of the engaging hole 35*b* (the engaging protrusion 43*b*).

Reducing the clearance a can further restrict the movement of the optical sheet 3.

Further, for the engagement in the region other than the central region of the optical sheet 3, it is desired that the clearances may be 0.1 to 0.2% of the length of the optical sheet 3 in both the X and Y directions. It is preferable that the minimum value of the clearance in the X direction is 0.15% of the length of the optical sheet 3 in the X direction.

On the other hand, it is preferable that the maximum value of the clearance is, for example, 1% of the length of the optical sheet 3, although it is variable depending on the material of the optical sheet 3. It is preferable that the maximum value may be approximately two to three times the minimum value.

However, the present invention is not limited to the above, the clearances c and d may be larger when the engagement position becomes farther from the central region. Further, the difference between the clearance in the Y direction and the clearance in the X direction may be larger when the engagement position becomes farther from the central region.

The above-mentioned configuration may be realized by adjusting any one of the sizes of the engaging hole 35 and the engaging protrusion 43.

Figure 7:
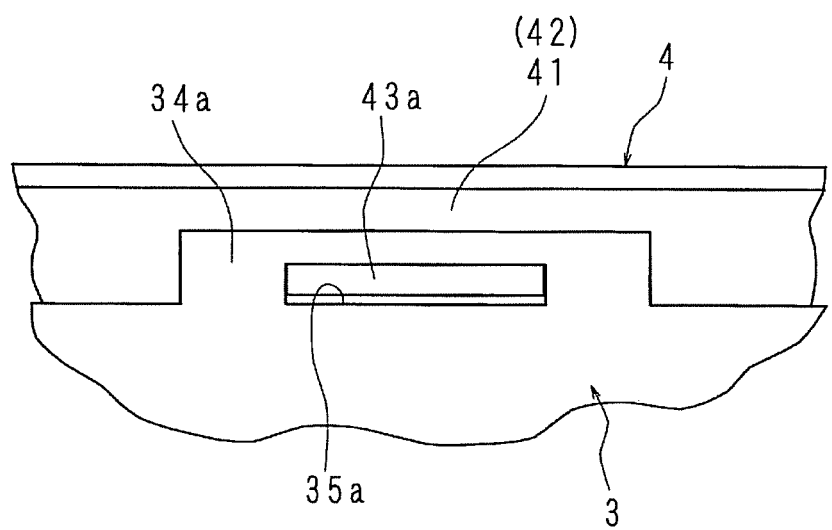
FIG. 7 illustrates an exemplary engagement between a central engaging protrusion and a central engaging hole in a liquid crystal television receiver according to a second embodiment.

FIG. 7 illustrates an exemplary engagement between the central engaging protrusion 43*a* and the central engaging hole 35*a* in the liquid crystal television receiver 100 according to a second embodiment.

In the second embodiment, in the engagement between the central engaging protrusion 43*a* and the central engaging hole 35*a*, it is configured in such a manner that the clearances a, d, and c are not formed and only the clearance b is formed.

Such a configuration can further increase the restriction force for restricting the movement of the optical sheet 3, while addressing the thermal expansion of the optical sheet 3 in the Y direction.

The present invention is not limited to the above-described embodiments, and it is possible to employ a configuration for setting the clearance a to have a predetermined size.

In the above-mentioned description, the engagement flanges 34 (the engaging holes 35) have been described as being provided only on the one long side of the optical sheet 3, and the engaging protrusions 43 have been described as being provided on the holding member 4 so as to correspond to the engaging holes 35. However, the present invention is not limited to the above-mentioned embodiments. For example, it is possible to employ a configuration for providing the engagement flanges 34 (the engaging holes 35) along another long side which is opposite to the one long side of the optical sheet 3.

Further, in the above-mentioned description, the liquid crystal television receiver 100 has been described as using a so-called edge type backlight. However, the present invention is not limited to the above-described embodiments, and the present invention is applicable to a liquid crystal television receiver using a so-called direct type backlight.

REFERENCE SIGN LISTS

1 liquid crystal display panel
3 optical sheet
4 holding member
34 engagement flange
34*a* central engagement flange
34*b* engagement flange other than central engagement flange
35 engaging hole
43 engaging protrusion
100 liquid crystal television receiver
a, b, c, d clearance

The invention claimed is:

1. A display apparatus comprising:
    a display panel including a front surface on which an image is displayed and a rear surface opposite to the front surface;
    an optical sheet having a rectangular shape, the optical sheet having a front surface facing the rear surface of the display panel and a rear surface opposite to the front surface of the optical sheet; and
    a holding member being a frame body having a rectangular opening, the holding member having a front surface facing the rear surface of the optical sheet and a rear surface opposite to the front surface of the holding member, wherein
    the optical sheet has a plurality of engaging holes formed in a peripheral region of the optical sheet along one side of the optical sheet,
    the holding member has a plurality of protrusions provided on the front surface of the holding member and each of the plurality of protrusions is engaged with one engaging hole of the plurality of engaging holes to hold the optical sheet so that the front surface of the optical sheet faces the rear surface of the display panel,
    the plurality of engaging holes include a first engaging hole provided to a central region of the one side of the optical sheet and at least one second engaging hole provided to a region other than the central region,
    the plurality of protrusions include a first protrusion engaged with the first engaging hole and at least one second protrusion engaged with the at least one second engaging hole,
    a distance, between an edge of the first engaging hole and the first protrusion, along a first direction in which the one side of the optical sheet extends is shorter than a distance, between an edge of the at least one second engaging hole and the at least one second protrusion, along the first direction, and
    the distance, between an edge of the first engaging hole and the first protrusion, along the first direction is shorter than a distance, between the edge of the first engaging hole and the first protrusion, along a second direction orthogonal to the first direction;
    wherein the distance, between the edge of the at least one second engaging hole and the at least one second protrusion, along the first direction is longer than a distance, between the edge of the at least one second engaging hole and the at least one second protrusion, along the second direction;
    wherein the plurality of engaging holes include a plurality of second engaging holes, and the plurality of protrusions include a plurality of second protrusions, each of the plurality of second protrusions is engaged with one second engaging hole of the plurality of the second engaging holes, and
    wherein the distance, between the edge of the second engaging hole and the second protrusion, along the first direction in a farther engagement position from the central region is longer than that in a nearer engagement position from the central region.

2. The display apparatus according to claim 1, wherein the plurality of engaging holes are further provided along another side, which is opposite to the one side, of the optical sheet.

3. The display apparatus according to claim 1, wherein each of the plurality of protrusions of the holding member has a constant size, and a width of the first engaging hole in the second direction is smaller than a width of the at least one second engaging hole in the second direction.

4. The display apparatus according to claim 1, wherein each of the plurality of engaging holes has a constant size, and a length of the first protrusion in the first direction is longer than a length of the at least one second protrusion in the first direction.

5. The display apparatus according to claim 1, wherein the optical sheet has a plurality of engagement flanges provided along the one side of the optical sheet, and each of the plurality of engaging flanges has one engaging hole of the plurality of engaging holes.

6. A display apparatus comprising:
a display panel including a front surface on which an image is displayed and a rear surface opposite to the front surface;
an optical sheet having a rectangular shape, the optical sheet having a front surface facing the rear surface of the display panel and a rear surface opposite to the front surface of the optical sheet; and
a holding member being a frame body having a rectangular opening, the holding member having a front surface facing the rear surface of the optical sheet and a rear surface opposite to the front surface of the holding member, wherein
the optical sheet has a plurality of engaging holes formed in a peripheral region of the optical sheet along one side of the optical sheet,
the holding member has a plurality of protrusions provided on the front surface of the holding member and each of the plurality of protrusions is engaged with one engaging hole of the plurality of engaging holes to hold the optical sheet so that the front surface of the optical sheet faces the rear surface of the display panel,
the plurality of engaging holes include a first engaging hole provided to a central region of the one side of the optical sheet and at least one second engaging hole provided to a region other than the central region,
the plurality of protrusions include a first protrusion engaged with the first engaging hole and at least one second protrusion engaged with the at least one second engaging hole,
a distance, between an edge of the first engaging hole and the first protrusion, along a first direction in which the one side of the optical sheet extends is shorter than a distance, between an edge of the at least one second engaging hole and the at least one second protrusion, along the first direction, and
the distance, between an edge of the first engaging hole and the first protrusion, along the first direction is shorter than a distance, between the edge of the first engaging hole and the first protrusion, along a second direction orthogonal to the first direction,
wherein a clearance between the edge of the first engaging hole provided in the central engagement flange and the first protrusion is formed only in the second direction.

7. The display apparatus according to claim 6, wherein the plurality of engaging holes are further provided along another side, which is opposite to the one side, of the optical sheet.

8. The display apparatus according to claim 6, wherein each of the plurality of protrusions of the holding member has a constant size, and a width of the first engaging hole in the second direction is smaller than a width of the at least one second engaging hole in the second direction.

9. The display apparatus according to claim 6, wherein each of the plurality of engaging holes has a constant size, and a length of the first protrusion in the first direction is longer than a length of the at least one second protrusion in the first direction.

10. The display apparatus according to claim 6, wherein the optical sheet has a plurality of engagement flanges provided along the one side of the optical sheet, and each of the plurality of engaging flanges has one engaging hole of the plurality of engaging holes.

11. A display apparatus comprising:
a display panel including a front surface on which an image is displayed and a rear surface opposite to the front surface;
an optical sheet having a rectangular shape, the optical sheet having a front surface facing the rear surface of the display panel and a rear surface opposite to the front surface of the optical sheet; and
a holding member being a frame body having a rectangular opening, the holding member having a front surface facing the rear surface of the optical sheet and a rear surface opposite to the front surface of the holding member, wherein
the optical sheet has a plurality of engaging holes formed in a peripheral region of the optical sheet along one side of the optical sheet,
the holding member has a plurality of protrusions provided on the front surface of the holding member and each of the plurality of protrusions is engaged with one engaging hole of the plurality of engaging holes to hold the optical sheet so that the front surface of the optical sheet faces the rear surface of the display panel,
the plurality of engaging holes include a first engaging hole provided to a central region of the one side of the optical sheet and at least one second engaging hole provided to an region other than the central region,
the plurality of protrusions include a first protrusion engaged with the first engaging hole and at least one second protrusion engaged with the at least one second engaging hole,
a distance, between an edge of the first engaging hole and the first protrusion, along a first direction in which the one side of the optical sheet extends is shorter than a distance, between an edge of the at least one second engaging hole and the at least one second protrusion, along the first direction, and
a clearance between the edge of the first engaging hole provided in the central engagement flange and the first protrusion is formed only in a second direction orthogonal to the first direction.

12. The display apparatus according to claim 11, wherein the plurality of engaging holes include a plurality of second engaging holes, and the plurality of protrusions include a plurality of second protrusions, each of the plurality of second protrusions is engaged with one second engaging hole of the plurality of the second engaging holes,
the distance, between the edge of the second engaging hole and the second protrusion, along the first direction in a farther engagement position from the central region is longer than that in a nearer engagement position from the central region.

13. The display apparatus according to claim 11, wherein the plurality of engaging holes are further provided along another side, which is opposite to the one side, of the optical sheet.

14. The display apparatus according to claim 11, wherein each of the plurality of protrusions of the holding member has a constant size, and a width of the first engaging hole in the second direction is smaller than a width of the at least one second engaging hole in the second direction.

15. The display apparatus according to claim 11, wherein each of the plurality of engaging holes has a constant size, and a length of the first protrusion in the first direction is longer than a length of the at least one second protrusion in the first direction.

16. The display apparatus according to claim 11, wherein the optical sheet has a plurality of engagement flanges provided along the one side of the optical sheet, and each of the plurality of engaging flanges has one engaging hole of the plurality of engaging holes.

\* \* \* \* \*